United States Patent
Degen et al.

(10) Patent No.: US 7,872,879 B2
(45) Date of Patent: Jan. 18, 2011

(54) SWITCHED MODE POWER CONVERTER AND METHOD OF OPERATION THEREOF

(75) Inventors: Peter Theodorus Johannes Degen, Arnhem (NL); Humphrey De Groot, Vlijmen (NL); Jan Dikken, Wijchen (NL)

(73) Assignee: NXP B.V., Eindhoven (NL)

( * ) Notice: Subject to any disclaimer, the term of this patent is extended or adjusted under 35 U.S.C. 154(b) by 270 days.

(21) Appl. No.: 11/817,778

(22) PCT Filed: Mar. 9, 2006

(86) PCT No.: PCT/IB2006/050746

§ 371 (c)(1),
(2), (4) Date: Aug. 22, 2008

(87) PCT Pub. No.: WO2006/095327

PCT Pub. Date: Sep. 14, 2006

(65) Prior Publication Data

US 2008/0304291 A1    Dec. 11, 2008

(30) Foreign Application Priority Data

Mar. 11, 2005   (EP) .................................. 05101931

(51) Int. Cl.
*H02M 3/335* (2006.01)
(52) U.S. Cl. ............... 363/21.06; 363/21.04; 363/21.14
(58) Field of Classification Search ............. 363/21.04, 363/21.06, 21.12, 21.14
See application file for complete search history.

(56) References Cited

U.S. PATENT DOCUMENTS

| | | | | |
|---|---|---|---|---|
| 4,441,146 A | * | 4/1984 | Vinciarelli | 363/20 |
| 6,038,147 A | * | 3/2000 | Jacobs et al. | 363/21.06 |
| 6,606,257 B2 | * | 8/2003 | Bourdillon | 363/21.12 |
| 7,002,818 B2 | * | 2/2006 | Hamilton | 363/127 |
| 7,173,831 B1 | * | 2/2007 | Vogman | 363/21.02 |
| 7,561,449 B2 | * | 7/2009 | Suzuki et al. | 363/55 |
| 2004/0136207 A1 | * | 7/2004 | Havanur | 363/21.06 |

FOREIGN PATENT DOCUMENTS

| CN | 1487657 A | 4/2004 |
|---|---|---|
| CN | 1262061 C | 6/2006 |
| EP | 1683253 A1 | 5/2005 |

OTHER PUBLICATIONS

Li, Q. M; et al "Large-Signal Transient Analysis of Forward Converter With Active-Clamp Reset" IEEE Transactions on Power Electronics, vol. 17, No. 1, Jan. 2002, pp. 15-24.

* cited by examiner

*Primary Examiner*—Jeffrey L Sterrett
*Assistant Examiner*—Fred E Finch, III

(57) ABSTRACT

A switched mode power converter is provided which includes a transformer (2) having a primary winding (2a) and at least one secondary winding (2b); a primary side active switch device (S1) coupled to the primary winding for selectively applying an input voltage to the primary winding; and a secondary side rectifier circuit including an output filter (6, 12) coupled to the at least one secondary winding (2), and first and second active switch devices (16, 14) coupled between the at least one secondary winding (2b) and the output filter. The switch devices are arranged such that each one is operable independently of the other to block current between the at least one secondary winding and the output filter in an opposite direction to the other. This facilitates better regulation of the converter and avoids the occurrence of voltage spikes encountered in existing configurations.

10 Claims, 11 Drawing Sheets

US 7,872,879 B2

SWITCHED MODE POWER CONVERTER AND METHOD OF OPERATION THEREOF

The present invention relates to the field of power conversion. In particular, the invention relates to a switched mode power converter and a method of operating such a converter.

Switched mode power converters are widely used in the electronics industry to convert one DC level voltage to another for supply to a load. Typically, a transformer is provided which isolates the voltage source on the primary side from the load on its secondary side. The input DC voltage is periodically switched across the primary side of the transformer using one or more power switches. Energy is stored in an output inductor and a regulated voltage is supplied to the load on the secondary side by switching the flow of current into the output inductor.

Two diodes on the secondary side rectify the switched and isolated voltage across the secondary winding, including a forward diode connected in series with the secondary winding that conducts current to the load when a positive voltage is present across the secondary winding, and a freewheeling diode connected in shunt with the secondary winding that conducts current to the load when no voltage or a negative voltage is present across the secondary winding.

In order to improve the efficiency of such a circuit, it is known to replace the rectifying diodes with power switches, for example MOSFET devices that are modulated by control means.

US-A-2004/0136207 discloses a switched mode power converter in which the forward diode is replaced by two MOSFET devices arranged with their sources connected together and their gates connected together so that the two devices are actively switched synchronously such that in an inactive state each one blocks current in an opposite direction.

A converter configured in accordance with the disclosure of US-A-2004/0136207 is shown in FIG. 1. It includes a transformer 2 having a primary winding 2a and a secondary winding 2b. The dot end of the primary winding 2a is coupled to an input voltage source Vin and the other end of the primary winding is coupled to ground through power switch S1.

More particularly, power switch S1 comprises a MOSFET device having a drain terminal coupled to the primary winding 2a, a source terminal coupled to ground and a gate terminal coupled to a primary side controller 4. The controller 4 provides periodic activation signals to the power switch S1 in response to feedback signals received from the secondary side of the forward converter or in a manner dependent on the input voltage. An input voltage source is connected to input voltage terminal 10.

On the secondary side, MOSFET devices Sb, Sr are coupled in series between the secondary winding 2b and an output inductor 6. The output inductor 6 is coupled to an output terminal 8, with a capacitor 12 coupled between the output terminal and ground. Inductor 6 and capacitor 12 form a filter that provides a smooth DC output voltage Vout at the output terminal 8 relative to ground.

The freewheeling diode has been replaced by MOSFET device Sf, having its source terminal coupled to ground and its drain terminal coupled to the junction of the output inductor 6 and MOSFET device Sr.

The output of the forward converter is regulated by modulating the on-time of the forward MOSFET devices Sb, Sr that act as a bi-directional switch.

The respective internal body diodes 14, 16 and 18 of MOSFET devices Sb, Sr and Sf are also shown.

As noted above, the gate terminals of forward MOSFET devices Sb and Sr are coupled together. Secondary side controller 20 provides control signals to a common gate input.

Disadvantages of the circuit arrangement shown in FIG. 1 will now be identified with reference to the waveforms shown in FIG. 2. Four exemplary waveforms are shown, representing (a) the logic state of power switch S1, (b) the voltage (Vsec) across the secondary winding of a transformer 2, (c) the logic state of switches Sb and Sr, and (d) the current ($I_L$) flowing through output inductor 6.

To enable zero voltage switching of S1 (particularly when there is a high load current), Sb and Sr may not be turned on within a certain time after Vsec becomes positive. This is to ensure that S1 is turned on before Sb and Sr are turned on. This time is indicated as "t1" in FIG. 2. At the time Sb and Sr are turned on, the output current has to commutate from Sf to Sb and Sr. As the voltage at node J is about zero volts, the transformed input voltage is now put entirely across the leakage inductance (Ls) of the transformer. Now the current through the secondary transformer winding and switches Sb and Sr increases and the current through Sf (or if it is turned off, through the body diode of Sf) decreases with a rate determined by the leakage inductance.

During the time the output current flows through Sf and Sb/Sr, the voltage at Vsec equals the voltage at node J, which is about zero. This time is called the commutation time.

When finally the output current flows entirely through Sb and Sr, node J will rise until it equalizes the secondary voltage (Vsec). A relatively small spike occurs at that time on Vsec, caused by the leakage inductance of the transformer and the parasitic drain to source capacitance of Sf.

Before Vsec becomes negative, Sb and Sr have to be turned off. This is to avoid a shorted winding via Sf (or its back gate diode 18) and Sb, Sr. The time between the turn-off of Sb, Sr and Vsec turning negative is indicated as "t2".

Therefore Sb and Sr are turned off when Vsec is still positive, and at that time a high current could be flowing through Sb and Sr. This causes a voltage spike due to the leakage inductance of transformer 2. This is apparent in waveform (b) in FIG. 2. It will be appreciated that this leakage inductance is due to the non-ideal nature of the coupling between primary and secondary sides of the transformer. Such a spike is highly undesirable and could ultimately destroy the switches Sb, Sr and/or the controller 20. A clamp circuit could be used to avoid this voltage spike, but this would lead to an increase of the power dissipation, which should be kept to a minimum.

The present invention provides a switched mode power converter including:
 a transformer having a primary winding and at least one secondary winding;
 a primary side active switch device coupled to the primary winding for selectively applying an input voltage to the primary winding; and
 a first secondary side rectifier circuit including a first output filter coupled to the at least one secondary winding, and first and second active switch devices coupled between the at least one secondary winding and the first output filter, the switch devices being arranged such that each one is operable to block current between the at least one secondary winding and the first output filter in an opposite direction to the other and switchable at different times to the other.

This facilitates better regulation of the converter and avoidance of the voltage spikes associated with the prior art arrangement discussed above. It also enables relatively smooth commutation from the freewheel switch device/diode to the first and second switch devices and vice versa. In particular, the converter may be a forward converter.

The first and second switch devices may be coupled together in series, or alternatively, coupled to respective ends of the at least one secondary winding.

In one implementation, each of the first and second switch devices has a control terminal and the converter includes control means coupled to the control terminals and operable to supply respective different control signals to the control terminals to open and close the switch devices. Preferably, each of the first and second switch devices comprises a FET having a source, drain and gate, with the respective control terminals coupled to the respective gates, and an integrated body diode in parallel with the source and drain connections, with the anode connected to the source and the cathode connected to the drain.

In one embodiment, the drains of the first and second switch devices may be coupled together in their bi-directional configuration. These switch devices can then readily be incorporated in a single package, with the respective semiconductor dies being mounted on a common leadframe. This provides both a cost reduction and a reduction in the volume of space required, relative to the provision of two separately packaged devices. Furthermore, if the drains of the first and second switch devices are coupled together, they may be integrated into a single die, giving a further cost reduction. Alternatively, the sources of the first and second switch devices may be coupled together.

In another embodiment, the first and second switch devices may be coupled to different ends of the secondary winding of the transformer so that each switch is able to block current between the secondary winding and the output filter in either direction.

In a further embodiment, the power converter comprises a second secondary side rectifier circuit including a second output filter, and a third active switch device comprising a FET having a source, drain and gate, its drain being coupled to the drains of the first and second switch devices, and its source being coupled to the second output filter. With this configuration, one of the active switch devices of the first rectifier circuit effectively forms half of the bi-directional switch of the second rectifier circuit as well, reducing the number of components required and therefore giving a further cost saving. Furthermore, with such a configuration in which the drains of the first and second active devices are coupled together, the first, second and third switch devices may be mounted on a common leadframe within a single package, and more preferably, integrated into a single die. Alternatively, if the drains of the first and second switch devices are connected to respective ends of the secondary winding, two of the first, second and third switches may be mounted on a common leadframe or integrated into a single die.

According to a further aspect of the invention, a method of operating a switched mode power converter of the form described above is provided, wherein the second switch device is arranged so as to be operable to block current from flowing in the direction from the at least one secondary winding to the output filter, the method including the step of switching the second switch device when the voltage across the at least one secondary winding is negative. When the secondary winding voltage turns negative, the current has commutated from the first and second active switch devices to the freewheel switch. After that, the second switch device can be turned off without causing any significant voltage spikes as the current through the switch devices is substantially equal to zero. The second switch device may be switched off at any time whilst the secondary winding voltage is negative.

When the primary side switch is switched off, the voltage across the secondary winding becomes zero and a large negative voltage is established at the other side of the leakage inductance of the transformer. The current through the leakage inductance (and so through the first and second switches) will then decrease, and as the current through the coil will remain almost constant, the current through the body diode of the freewheel switch will rise. The rate of change of this current depends on the magnitude of the leakage inductance and the voltage put across it. This is the moment that the freewheel switch can be switched on.

The first switch should now be switched off before the current through it becomes zero, i.e. when the voltage across the at least one secondary winding is substantially below a predetermined positive value or equal to zero. The current will then start to flow through its body diode. A preferred moment in practice for switching off the first switch is when the voltage across the secondary winding becomes zero. Theoretically, for maximum efficiency, the first switch may be switched off later, at the latest at the time its current becomes zero, but that may be more difficult to achieve in practice. The second switch remains on until the current through the body diode of the first switch has dropped to zero. When that happens the body diode of the first switch blocks and the secondary winding voltage becomes negative. At that moment or after a certain delay, the second switch can be switched off with zero current. The current through the leakage inductance has become zero and so there will be no voltage spike.

In addition, the invention provides a method of operating a switched mode power converter of the form described above wherein an active clamp circuit is provided on the primary side, comprising a capacitive means and a fourth active switch device coupled together in series, and in parallel with the primary winding, the method including the step of turning the primary side active switch device on a predetermined time after the fourth active switch is turned off, said predetermined time being dependent on the input voltage. In this way, the maximum voltage across the primary side power switch is minimised and, during normal operation, facilitates turning on the primary side power switch whilst the voltage across it is substantially equal to zero. The magnetizing current due to the magnetizing inductance of the transformer discharges the parasitic capacitance of the primary side power switch, whilst the second active switch is off.

It will be appreciated that the improved switch mode power converter configurations described herein are suitable for a wide variety of applications. In particular, their use is beneficial in applications where relatively high currents are drawn, such as personal computer ("PC") power supplies.

Embodiments of the invention will now be described by way of example and with reference to the accompanying schematic drawings wherein.

Figure 1:
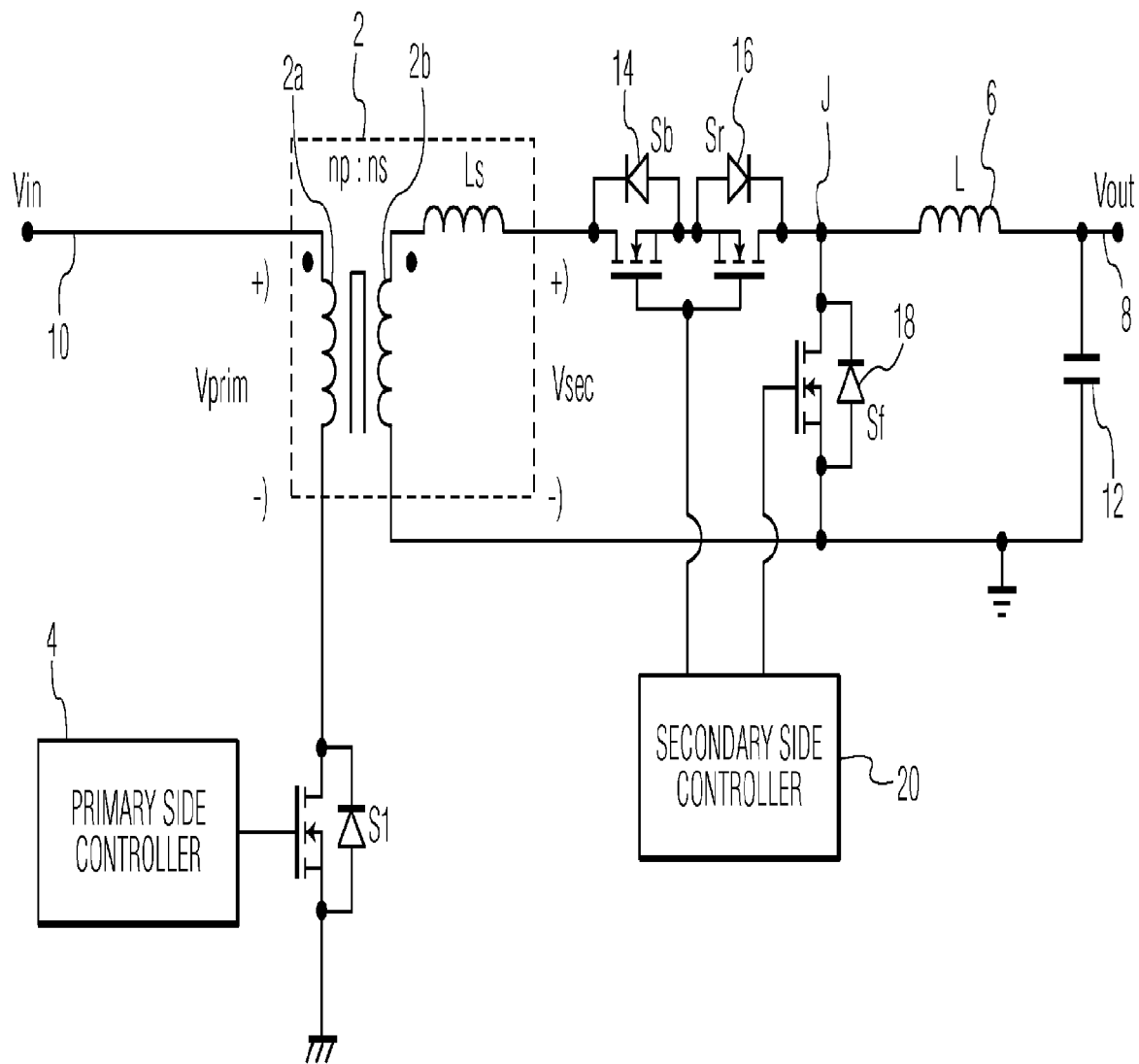
FIG. 1 shows a circuit diagram of a known switched mode forward converter.
Figure 3:
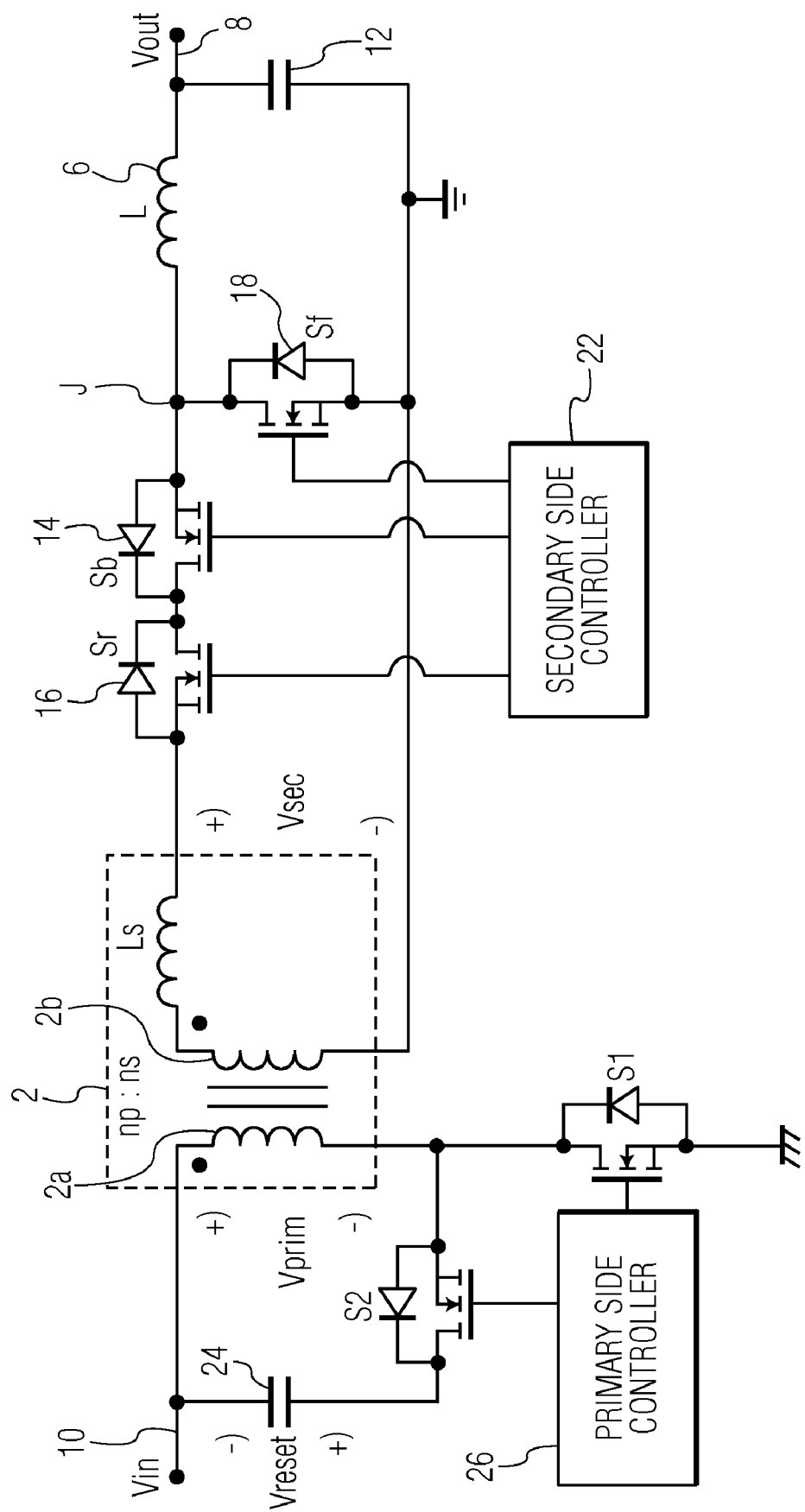
FIG. 3 shows a circuit diagram of a switched mode forward converter according to a first embodiment of the invention.

In the embodiment of the invention shown in FIG. 3, MOSFET devices Sb and Sr (forming the second and first active switch devices, respectively, referred to herein) are arranged with their drains connected together, in contrast to the prior arrangement of FIG. 1, in which their sources are connected together. Each device is modulated independently of the other using respective gate signals from secondary side controller 22.

Sb controls current flow and is termed the "bi-directional" switch, Sr is termed the "rectifying" switch, and Sf is the "freewheel" switch.

In FIG. 3, an additional inductor Ls is shown between the secondary winding and Sr to represent a parasitic inductance, namely the leakage inductance of the transformer 2.

An active clamp circuit is provided on the primary side, consisting of a capacitor 24 in series with an active switch device S2, which are together in turn connected in parallel with the primary winding 2a of transformer 2. Both the primary side active switch devices S1 and S2 receive modulating control signals from primary side controller 26. Provision of the active clamp circuit reduces the required breakdown voltage rating of the primary side active switch device and secondary side switches Sr and Sb (under the condition that the duty cycle is made inversely proportional to the input voltage), with the result that lower cost devices may be used (such as circuit is disclosed in U.S. Pat. No. 4,441,146).

Figure 2:
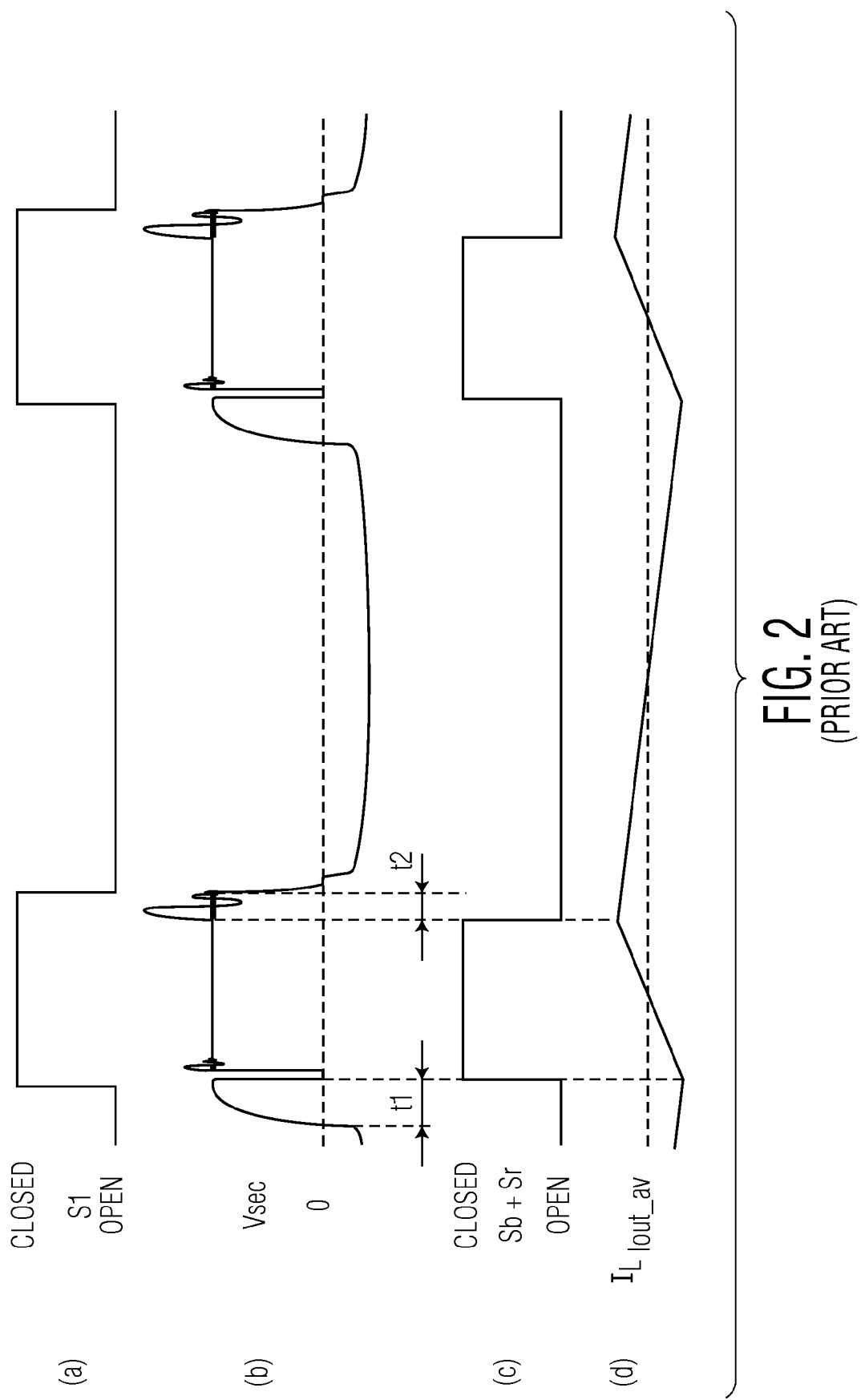
FIG. 2 shows exemplary waveforms generated during operation of the circuit shown in FIG. 1.
Figure 4:
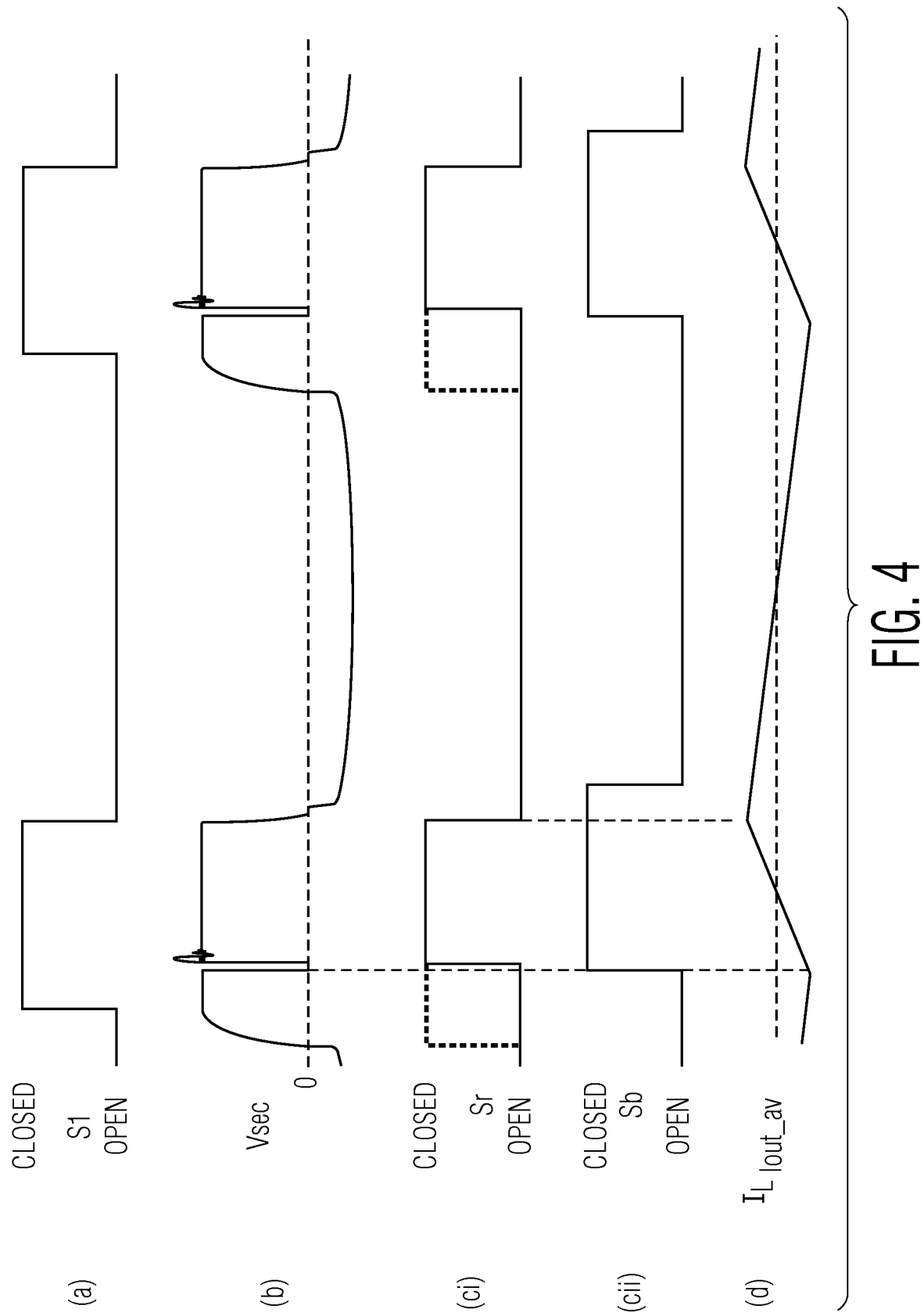
FIGS. 4 and 5 show exemplary waveforms generated during operation of the circuit shown in FIG. 3.

Exemplary waveforms generated during operation of the circuit shown in FIG. 3 are illustrated in FIG. 4. The signals measured correspond to those shown in FIG. 2, except that, in view of the independent control of Sr and Sb, separate respective control signals (ci) and (cii) are shown.

Once the voltage across the secondary winding, Vsec, has turned positive, Sr may be turned on. Turn on of Sr at this earliest opportunity is shown by a dotted line in control signal (ci) of FIG. 4. At this stage, Sb is still off, and so zero voltage switching of S1 is facilitated.

Depending on the output voltage required, Sb is turned on after a certain time by the controller 22. For maximum efficiency, Sr should also be turned on at this time. In the embodiment of FIG. 4, Sr is turned on later, when node J becomes positive. When the voltage across the secondary winding drops following turn off of S1, Sr is turned off and Sb stays on. When the secondary winding voltage turns negative, the current has commutated from Sr and Sb to Sf. After that, Sb can be switched off without causing any significant voltage spikes. When the secondary winding voltage has turned negative, the current has commutated from one loop to the other and the current in the first and second switches has become zero.

Due to the inherent leakage inductance Ls of the transformer, the voltage across the secondary winding is zero during this commutation time. This assures proper turn off of Sr.

It can be seen in waveform (b) of FIG. 4 that the voltage Vsec is zero for a small period of time before it turns negative.

This time is also the moment that Sr should be switched off. As Sr has to be off before Vsec is negative, this is a suitable window of time in which to be switched off while Vsec is zero. This short period that Vsec is zero is caused by the leakage inductance. Switch Sb can then be switched off at anytime whilst the voltage across the secondary winding is negative.

Figure 5:
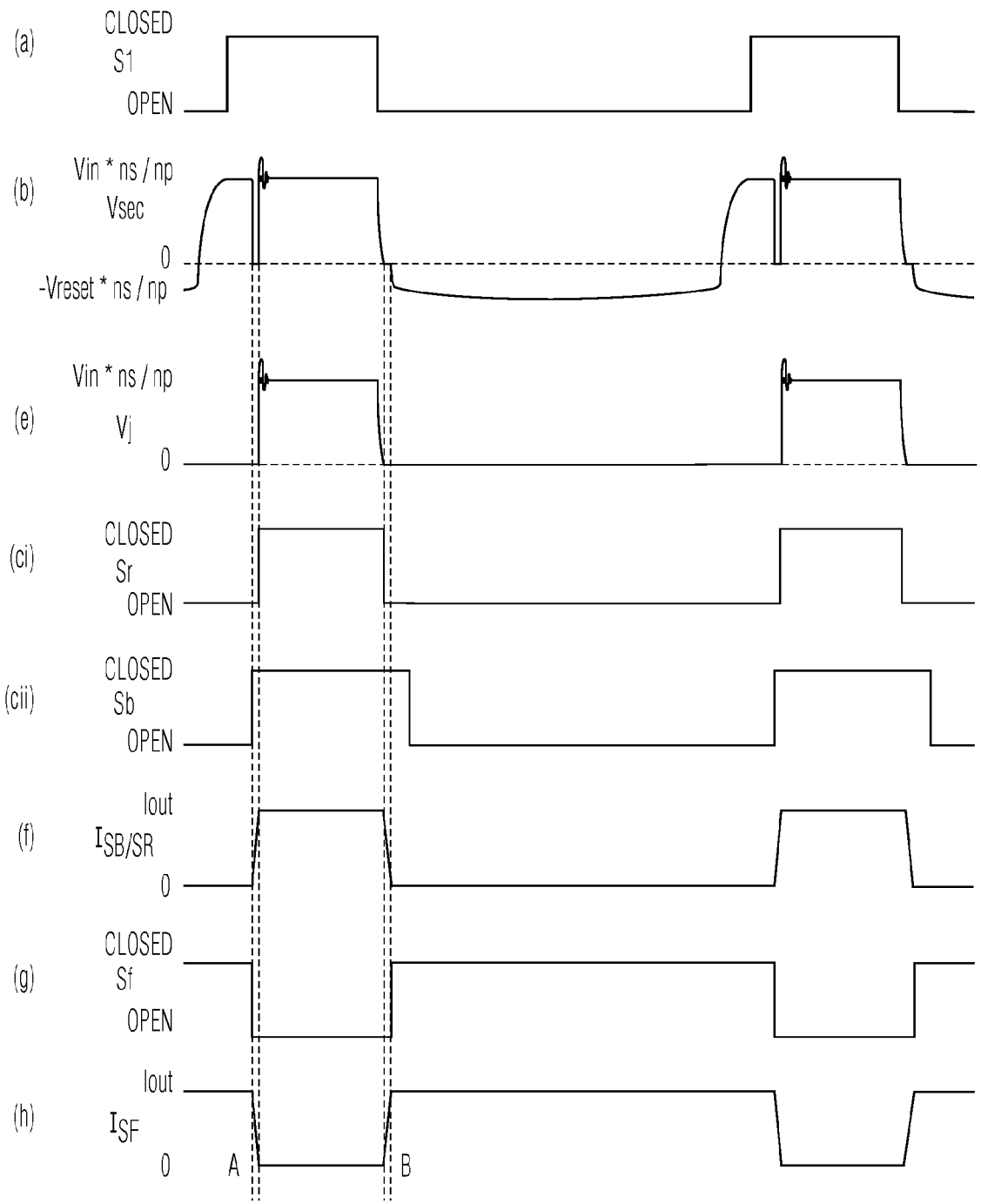

FIG. 5 is similar to FIG. 4, except that additional typical waveforms are shown, namely:

(e) represents the voltage at junction J of connections to Sb, inductor 6 and Sf, shown in FIG. 3;

(f) represents the current flowing through switches Sb and Sr;

(g) the logic state of freewheel switch Sf; and (h) the current flowing through switch Sf.

Pairs of arrows marked "A" and "B" identify the commutation periods.

It can be seen that when switch Sb is turned on by the secondary side controller, Sf is turned off and its body diode will start conducting the current. Theoretically, for maximum efficiency, Sf may be switched off later, at the latest at the time its current becomes zero, but that is much more difficult to achieve. As long as current flows through the body diode of Sf, the voltage at node J remains practically zero. Because Sb is on, the voltage Vsec will also become practically zero. A large positive voltage is established at the other side of the leakage inductance Ls. As a result, the current commutates from Sf to Sr and Sb. Once the voltage at junction J becomes positive, Sr is turned on as well. Alternatively, Sr can be switched on at the same time as Sb, or even when Vsec becomes positive.

When the primary side switch is switched off, the voltage across the secondary winding Vsec becomes zero and a large negative voltage is established at the other side of the leakage inductance of the transformer. The current through the leakage inductance (and so through Sr and Sb) will then decrease, and as the current through the coil will remain almost constant, the current through the body diode of Sf will rise. (The rate of change of this current depends on the magnitude of the leakage inductance and the voltage put across it.) This is the moment that Sf can be switched on.

Sr should be switched off before the current through it becomes zero. The current will then start to flow through its body diode. A preferred moment in practice for switching off Sr is when Vsec becomes zero. Theoretically, for maximum efficiency, Sr may be switched off later, at the latest at the time its current becomes zero, but that may be more difficult to achieve in practice. Sb remains on until the current through the body diode of Sr has dropped to zero. When that happens the body diode of Sr blocks and Vsec becomes negative. At that moment or after a certain delay, Sb can be switched off with zero current. The current through the leakage inductance has become zero and so there will be no voltage spike.

Figure 6:
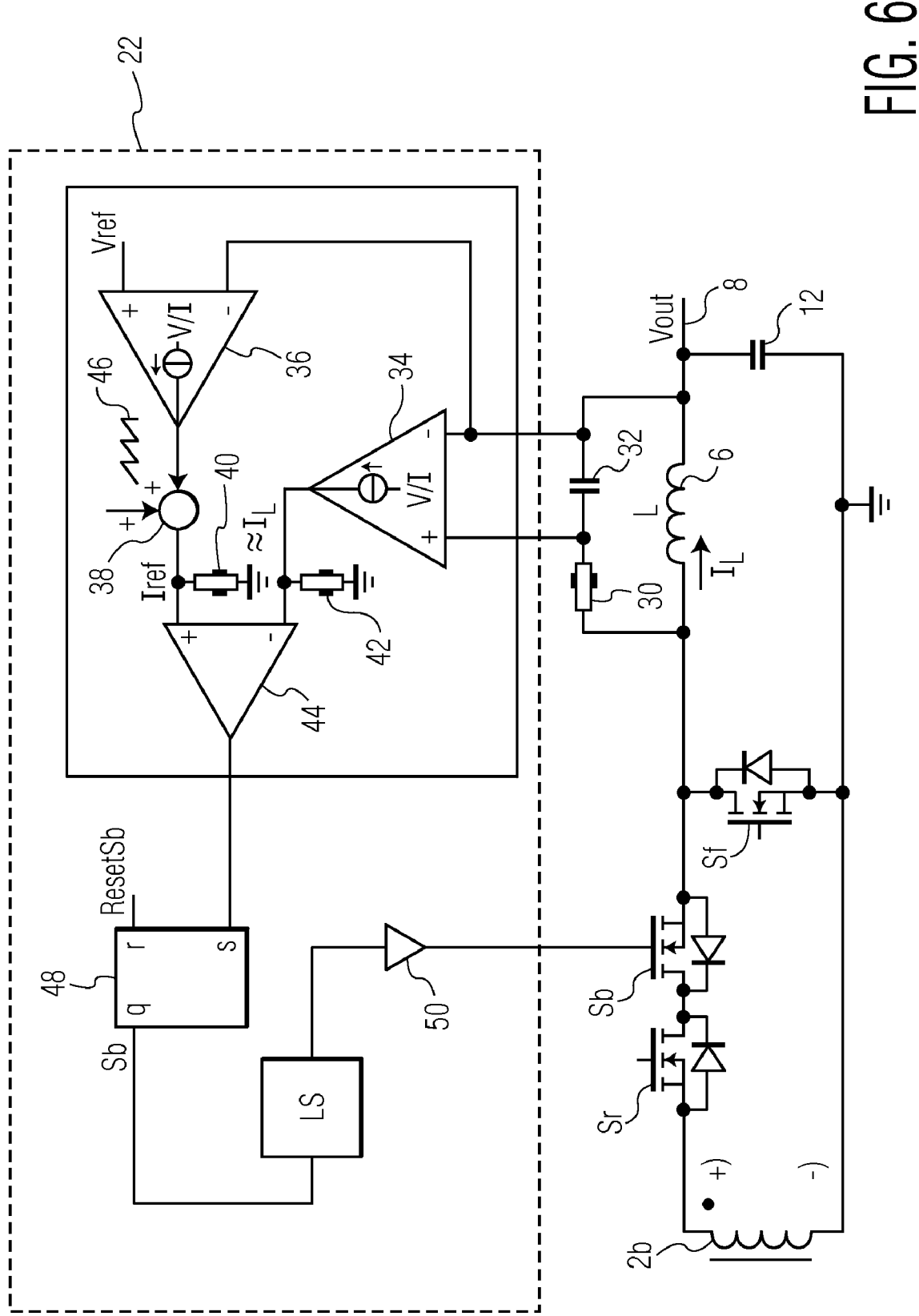
FIG. 6 shows a circuit diagram of an arrangement for regulating the switching of switch Sb according to an embodiment of the invention.

FIG. 6 shows an implementation of part of secondary side controller 22 which operates to regulate switch Sb, according to an embodiment of the invention. In the illustrated embodiment, a current mode controller is shown. It will be appreciated that other types of regulation may be employed, such as voltage mode control or duty cycle mode control.

Resistor 30 and capacitor 32 are connected together in series, and in turn, are connected in parallel with inductor 6. The inputs of a voltage-to-current converter ("V/I converter") 34 are connected across capacitor 32. The negative input of the V/I converter 34 is connected to the negative input of a further V/I converter 36, which has a reference voltage, $V_{REF}$, applied to its positive input terminal. The output of converter 36 is connected to a node 38, to which ramped waveform 46 is also applied. These two currents are added together at node 38. Node 38 is in turn connected to the positive input of a comparator 44, whilst the output of converter 34 is connected to its negative input. Resistors 40 and 42 convert the currents coming from node 38 and converter 34 into voltages.

The output of voltage comparator 44 is coupled to the "s" input of reset dominant latch 48. The "r" input thereof is dominant with respect to its "s" input. A signal "Reset Sb" (which is logically "1" when Vsec is negative, and "0" otherwise) is applied to the "r" input of latch 48. Its output "q" is connected to the gate of switch Sb via a levelshifter Ls and an output buffer 50.

Figure 7:
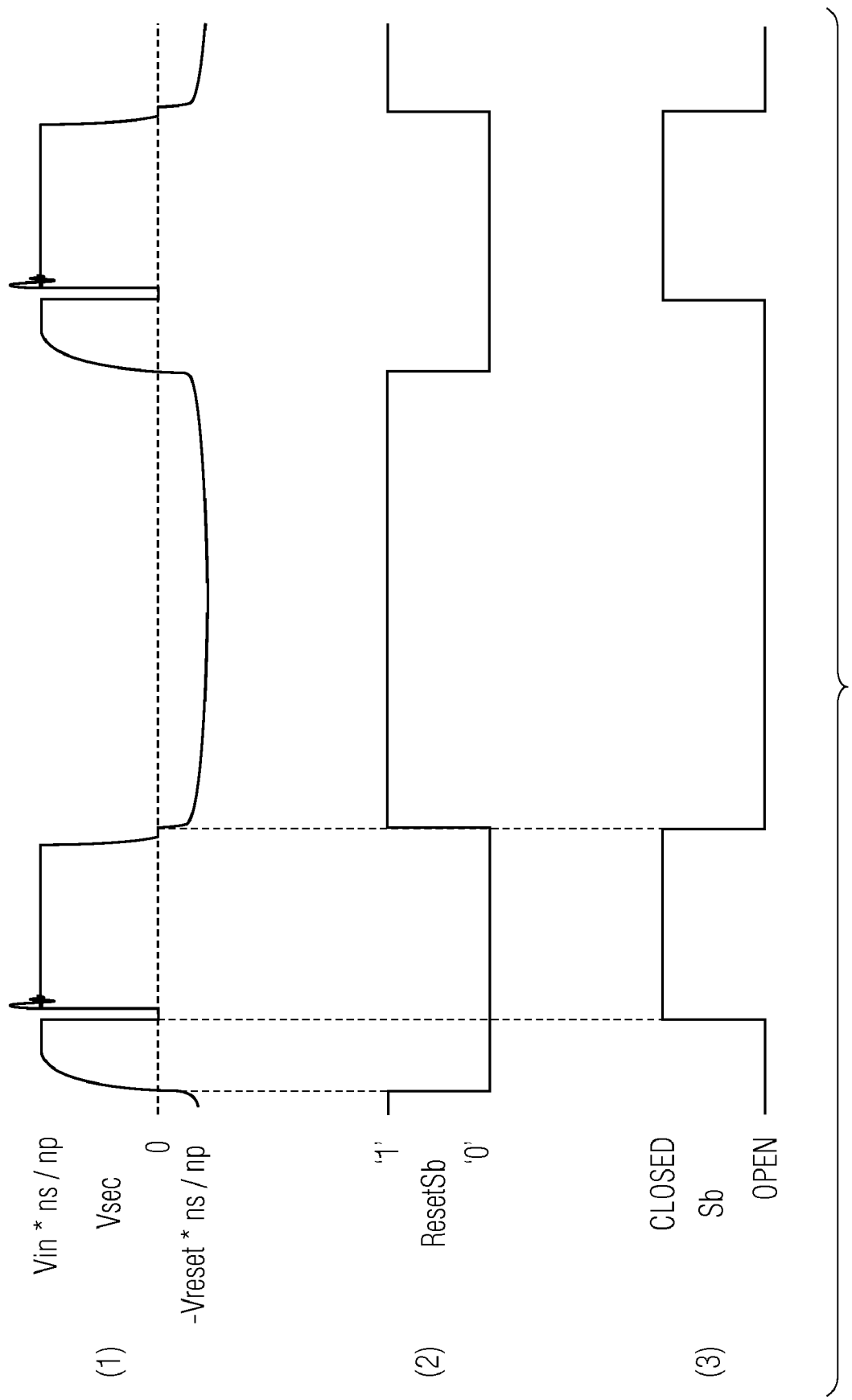
FIGS. 7 and 8 show waveforms generated during the operation of the circuit arrangements shown in FIG. 6.

The operation of the circuit shown in FIG. 6 will now be described. Exemplary waveforms generated during operation of the circuits are shown in FIG. 7. Waveform (1) is the voltage Vsec across the secondary winding 2b; (2) is the logic state of signal "Reset Sb"; and (3) is the logic state of switch Sb.

The RC network consisting of resistor 30 and capacitor 32 connected across the output inductor 6 measures the output current $I_L$. The values of resistor 30 and capacitor 32 are selected such that:

$$RC = \frac{L}{R_L}$$

where L is the inductance of inductor 6, and $R_L$ is its series resistance (not shown in the Figure). In this case, the voltage across the capacitor 32 equals the voltage across the series resistance of the inductor, and so the measured voltage is indicative of the output current.

The voltage across capacitor 32 is converted into a current by V/I 34, the output currents of converter 34 therefore being representative of the output current $I_L$, and is therefore denoted as $\approx I_L$ in FIG. 6. The difference between the voltage at the negative input of converter 34 and reference voltage $V_{REF}$ is converted into a current by converter 36. To avoid instability when the duty cycle is below 50%, a ramped waveform 46 is added to the output of converter 34, resulting in current $I_{REF}$.

When signal $\approx I_L$ drops below $I_{REF}$, the output current is below the required output current to achieve the required output voltage, so comparator 34 and latch 48 cooperate to turn Sb on under these circumstances, under the condition that Reset Sb=0.

Sb is turned off in response to the Reset Sb signal, which becomes active when Vsec becomes negative.

Figure 8:
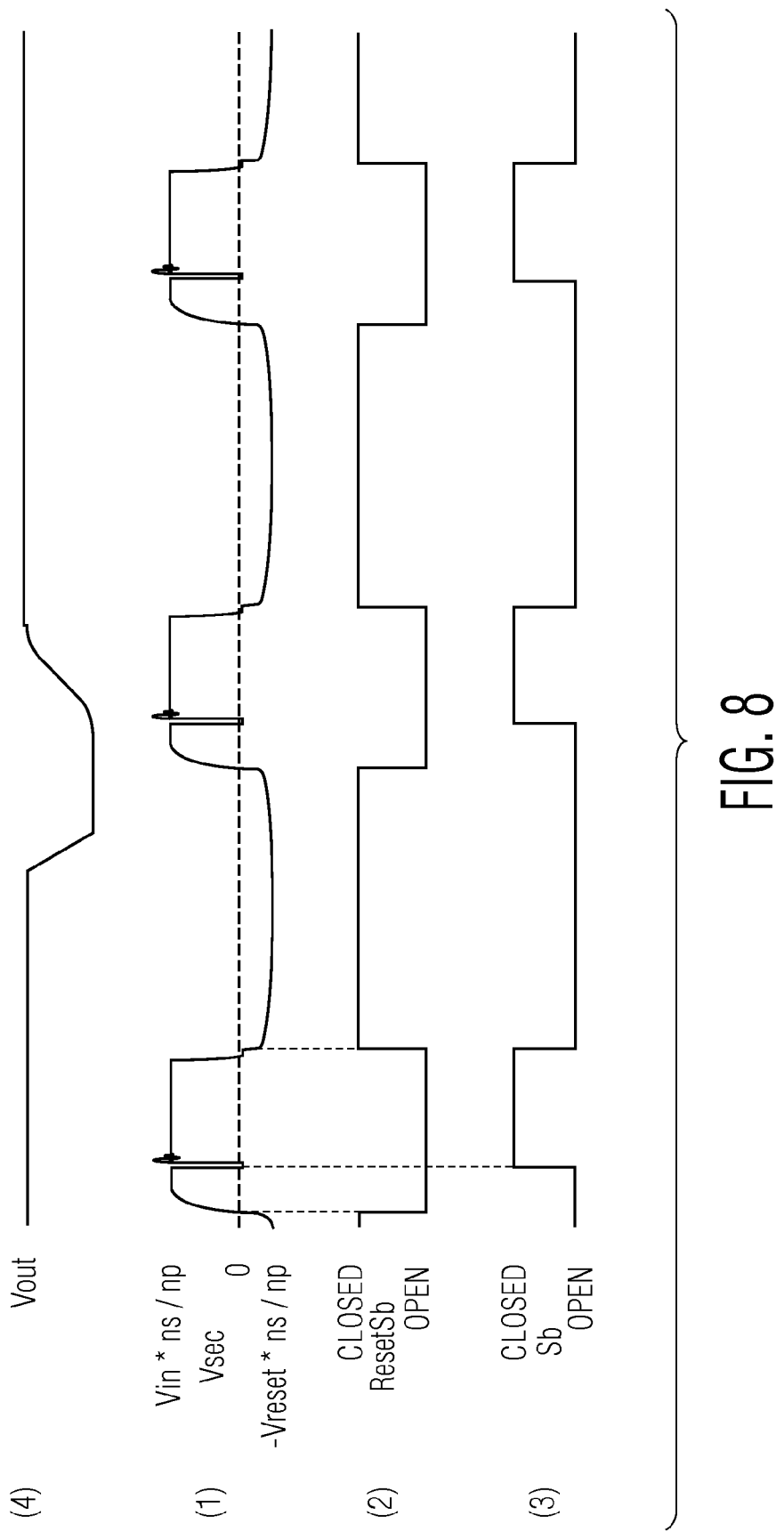

FIG. 8 shows further waveforms corresponding to (1) to (3) shown in FIG. 7. In addition, the voltage $V_{OUT}$ at output terminal 8 is shown as waveform (4). The Figure illustrates the response of the embodiment illustrated in FIG. 6 to a transient waveform at the output 8 of the circuit. In the example illustrated, the output voltage drops temporarily, which may be caused for example by an increase in the output current.

When the output voltage is dropped, $I_{REF}$ increases. This results in an increase in the on-time of Sb. As soon as the output voltage is at the required level, the duty cycle of Sb is stabilised again. The time for which the voltage across the secondary winding of the transformer, Vsec, is positive remains the same despite the transient output voltage, which therefore means that load regulation is achieved at the secondary side. The regulation determines the moment Sb is switched on. As load transients only influence the duty cycle of the secondary side switches, the duty cycle of primary side switch S1 is unchanged. In this way, the voltage across S1 is kept to a minimum, in contrast to prior circuit configurations, for example, as described in "Large Signal Transient Analysis of Forward Converter with Active-Clamp Reset", IEEE Transactions on Power Electronics, Vol. 17, No. 1, January 2002.

To modify the prior circuit shown in FIG. 1 to add a second output voltage supply, it will be necessary to provide two further switches arranged in the same manner as Sb and Sr in the additional circuit. In contrast, in modifying the embodiment of the invention shown in FIG. 3, in which switches Sr and Sb have their drains connected together, the additional circuit may be provided using fewer switches than would otherwise be required. An embodiment of the circuit according to the invention in which two voltage outputs are provided is shown in FIG. 9.

Figure 9:
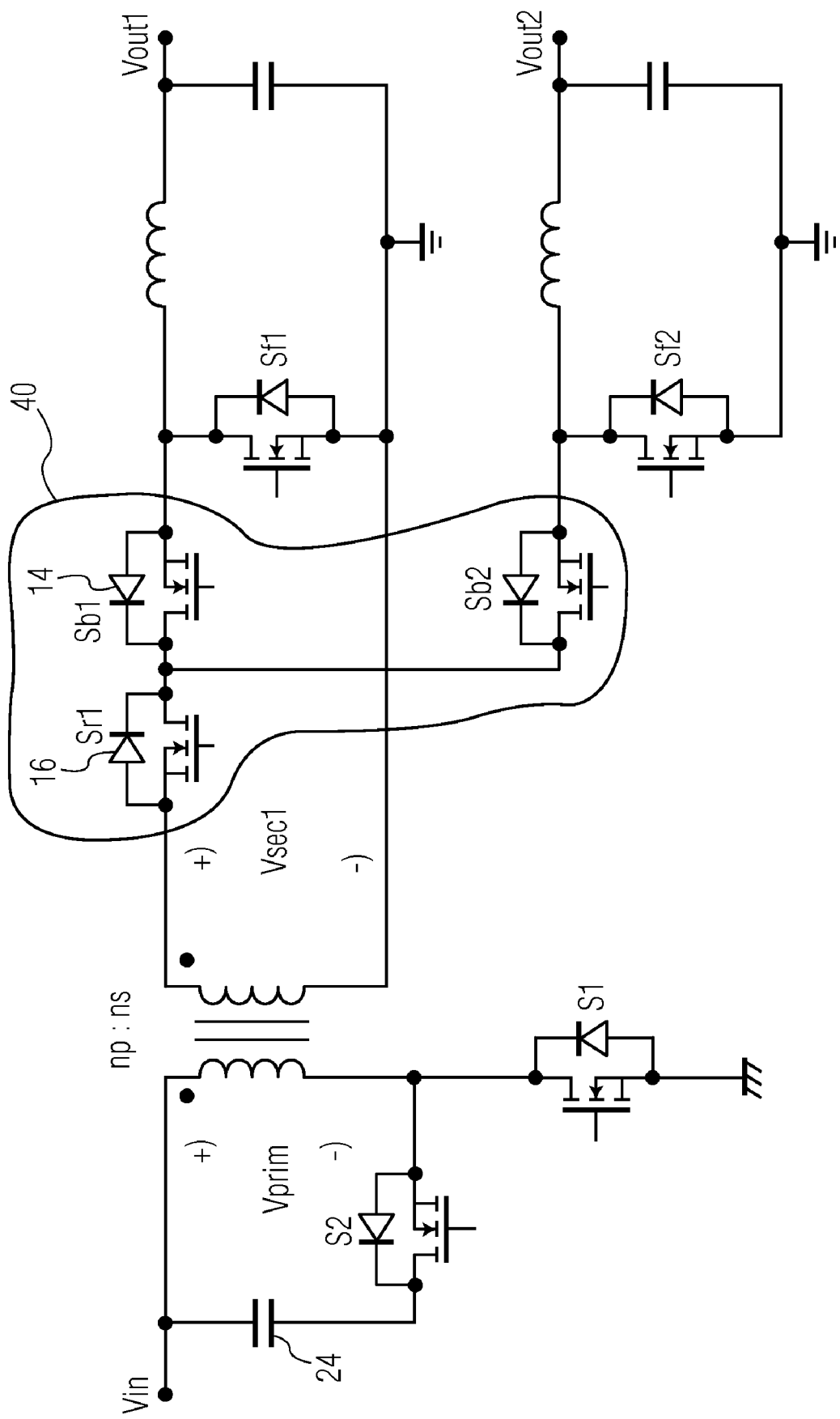
FIG. 9 shows a circuit diagram of a switched mode power converter having two voltage outputs according to a further embodiment of the invention.

Switches Sr and Sb of the first circuit in FIG. 9 are denoted Sr1 and Sb1. The second circuit includes a bi-directional switch Sb2. Instead of including a further rectifying switch Sr2 in the second circuit, to provide for current blocking in both directions, the drain of Sb2 is connected to the drains of Sr1 and Sb2 in the first circuit. In this way, the single rectifying switch Sr1 is shared between the first and second circuits. It will be appreciated that removal of the requirement for a further switch leads to a cost saving.

Furthermore, as the drains of switches Sr1, Sb1 and Sb2 are all connected together, they can be mounted on a common leadframe within a single package (schematically indicated by enclosure 40), or even integrated in a single die, giving further cost reductions. This also means that fewer packages need to be mounted on a heat sink in the finished device, significantly reducing the amount of space required.

Figure 10:
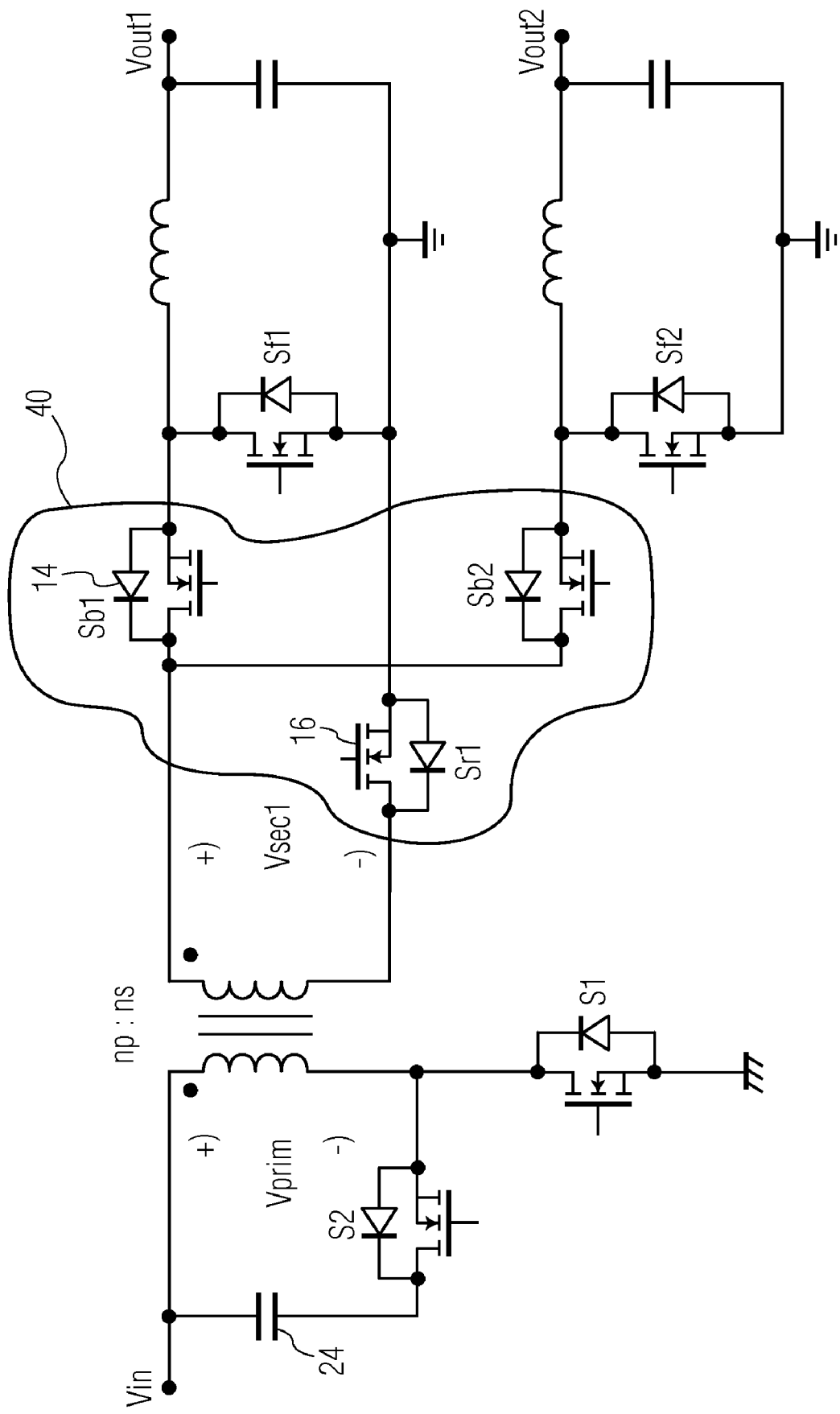
FIG. 10 shows a circuit diagram of a switched mode power converter, also having two voltage outputs, according to another embodiment of the invention.

FIG. 10 shows an alternative embodiment of a circuit according to the invention with two voltage outputs. The circuit of FIG. 10 has similar elements to the circuit of FIG. 9, which are denoted with the same reference signs.

As shown in FIG. 10, the drains of the first and second active switches Sr1, Sb1 are connected on different ends of the secondary winding of the transformer, with the bidirectional switch Sb1 "high side", so that the pair of switches Sr1, Sb1 is able to block current in either direction between the transformer and the output filter (i.e. bidirectional current blocking).

As the skilled person will appreciate, this alternative arrangement of connecting the active switches Sr1, Sb1 may be used, instead of the arrangement of the switches Sr, Sb in the embodiment of FIG. 3, to form a circuit with a single output voltage in accordance with the invention. In such an arrangement, either the sources or the drains of the switches Sr, Sb may be connected to the different ends of the secondary winding, according to the desired implementation.

In addition, the embodiment of FIG. 10 has a second rectifier circuit, to provide a second output voltage, comprising a third active (current controlling) switch Sb2, a freewheeling switch Sf2 and a second output filter formed from an inductor and a capacitor. The drain of the third active switch Sb2 is coupled to the drain of the switch device Sb1, with both the second and third switches Sb1, Sb2 coupled on the high side of the transformer. This arrangement avoids the need for a further active switch in the second circuit, since the switch Sr1 is shared between the first and second rectifier circuits to provide for bidirectional current blocking.

To minimise the switching losses in primary side switch S1 during operation of the circuit shown in FIG. 3, S1 is turned on when the voltage across it is zero. This is possible once the parasitic capacitance of switch S1 has been discharged by the magnetising current. The system therefore has to wait a certain "deadtime" after switch S2 has been turned off, before turning on switch S1. A drawback of this deadtime is that the time required to reset the transformer is reduced by the length of the deadtime. If the time taken to reset the transformer is relatively long compared to this deadtime, the increase of the reset voltage is minimal. However, at a low input voltages, the reset time is short and any reduction of this time results in a significant increase in the reset voltage. This causes an increase in the maximum voltage across S1 which is undesirable for the reasons given above.

Figure 11:
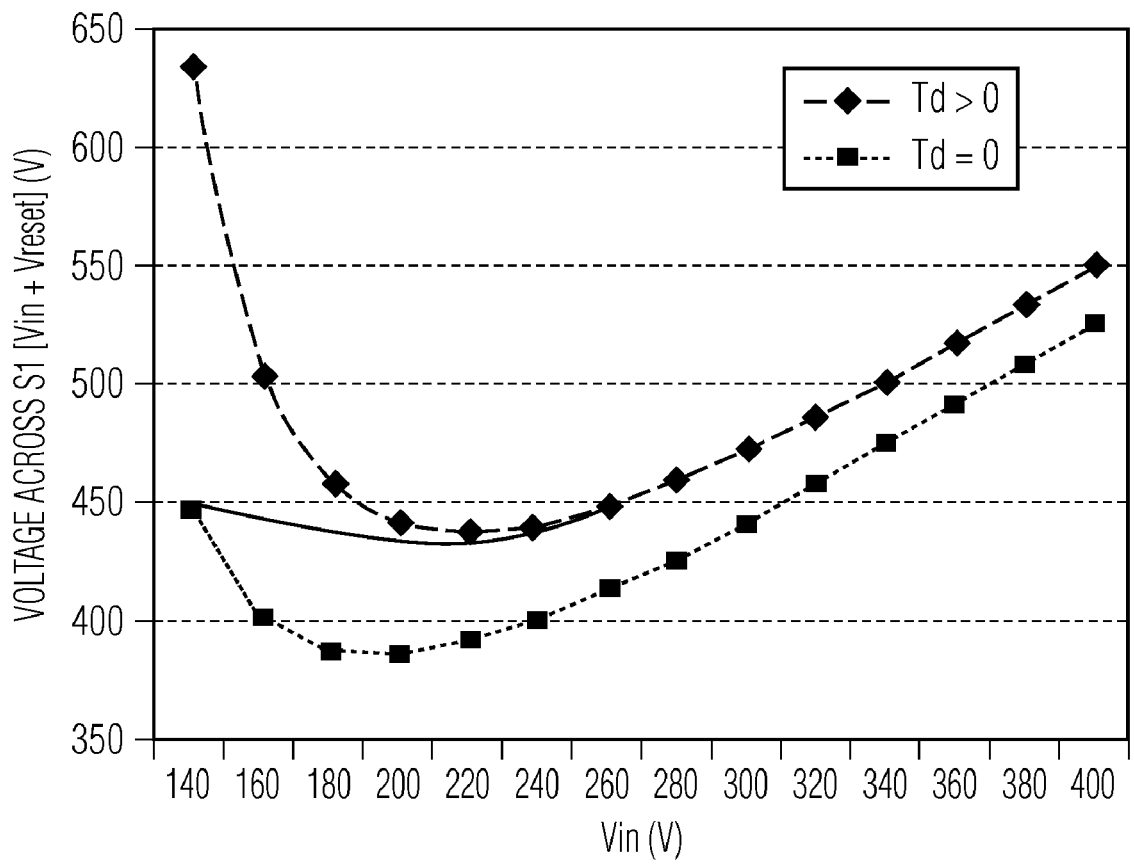
FIG. 11 shows plots of the voltage across the primary side power switch against input voltage for different delays (deadtime) between the turning off of the fourth active switch device and turning on the primary side power switch.

FIG. 11 shows plots of the voltage across S1 against input voltage for different deadtimes (Td). A deadtime of zero generates the plot shown by a dotted line, whilst a finite deadtime results in the plot marked by a dashed line. It can be seen that in the latter case, the voltage across S1 increases significantly at low input voltages.

Figure 12:
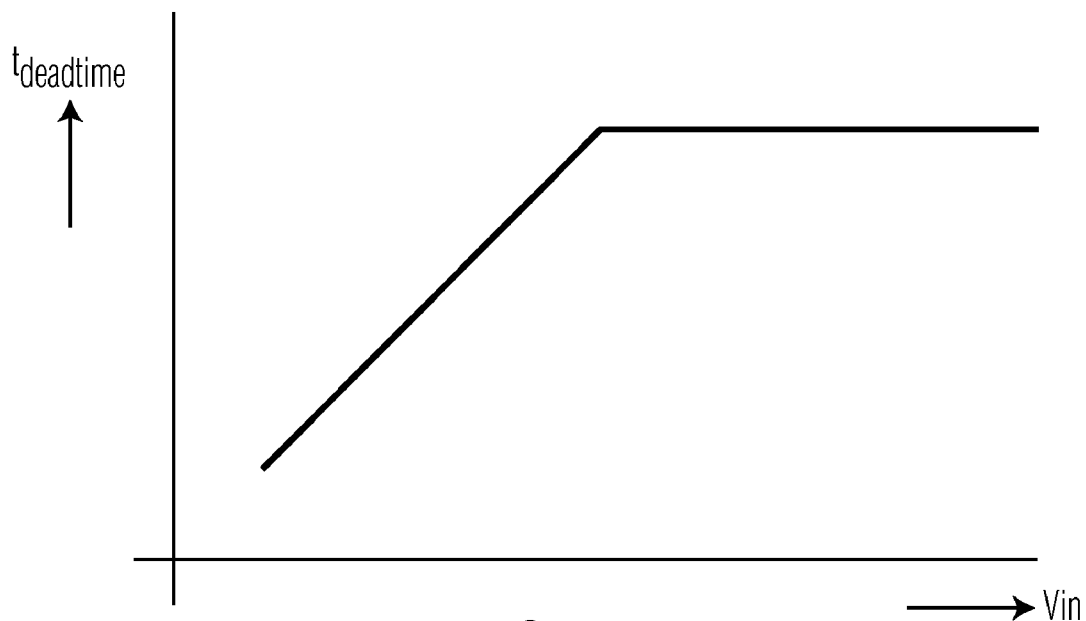
FIG. 12 shows a plot of deadtime against input voltage in accordance with an embodiment of the invention.

According to an embodiment of the invention, the deadtime is linearly reduced below a given input voltage (say 250V), as illustrated in FIG. 12. Above this voltage threshold, the deadtime is maintained at a constant level. Variation of the deadtime down to zero in this manner leads to variation of the voltage across the switch S1 with input voltage shown in FIG. 11 by a solid line. It can be seen that, relative to the dashed line, the voltage across S1 at low input voltages is significantly reduced.

In practice, it may be preferable not to decrease the deadtime to zero with decreasing input voltage, but, for example, to a value such that the voltage of Vreset+Vin (which is the voltage across the primary main switch) at Vin=150V equals Vreset+Vin at Vin=400V. In this way the voltage across the primary main switch is minimized but the deadtime is still kept to a maximum value. ($Vin_{minimum}$=150V, $Vin_{maximum}$=400V). It is also true though that a higher drain voltage lower than the breakdown voltage is allowed during a limited time to reach a certain lifetime requirement.

A typical application for the configurations of power converter described above is in the power supply of a personal computer ("PC"). Such a power supply is described for example in the Applicant's co-pending European Patent Application No. 03104073.6. There is increasing demand for power supplies for PCs that can deliver more power, but with greater efficiency and lower cost. Supplies embodying the present invention may be configured to address these issues.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

The invention claimed is:

1. A switched mode power converter including:
   a transformer having a primary winding and at least one secondary winding;
   a primary side active switch device coupled to the primary winding for selectively applying an input voltage to the primary winding;
   a first secondary side rectifier circuit including a first output filter coupled to the at least one secondary winding, and first and second active switch devices each comprising a first and second Field Effect Transistor each having a source, drain and gate with the respective drains of the first and the second Field Effect Transistor being coupled together, the first and second switch devices being coupled between the at least one secondary winding and the first output filter, the first and second switch devices being arranged such that each one is operable to block current between the at least one secondary winding and the first output filter in an opposite direction to the other and switchable at different times to the other; and
   a second secondary side rectifier circuit including a second output filter, and a third active switch device comprising a third Field Effect Transistor having a source, drain and gate, its drain being coupled to the respective drains of the first and second switch devices, and its source being coupled to the second output filter.

2. A power converter of claim 1 wherein each of the first and second switch devices has a control terminal, and the converter includes control means coupled to the control terminals and operable to supply respective different control signals to the control terminals to open and close said switch devices.

3. A power converter of claim 1 wherein the first and second switch devices are mounted on a common leadframe.

4. A power converter of claim 1 wherein the first and second switch devices are integrated into a single die.

5. A power converter of claim 1 wherein the first, second and third switch devices are mounted on a common leadframe.

6. A power converter of claim 1 wherein the first, second and third switch devices are integrated in a single die.

7. A PC power supply including the power converter of claim 1.

8. A method of operating the switched mode power converter of claim 1 wherein the second switch device is arranged so as to be operable to block current from flowing in the direction away from the at least one secondary winding to the output filter, the method including the step of switching the second switch device off when the voltage across the at least one secondary winding is negative.

9. A method of operating the switched mode power converter of claim 1 wherein the first switch device is arranged so as to be operable to block current from flowing in the direction towards the at least one secondary winding from the output filter, the method including the step of switching the first switch device off when the voltage across the at least one secondary winding is substantially below a predetermined positive value or is substantially equal to zero.

10. A method of operating the switched mode power converter of claim 1 wherein an active clamp circuit is provided on the primary side, comprising a capacitive means and a fourth active switch device coupled together in series, and in parallel with the primary winding, the method including the step of turning the primary side active switch device on a predetermined time after the fourth active switch is turned off, said predetermined time being dependent on the input voltage.

* * * * *